US012789407B2

(12) United States Patent
Du et al.

(10) Patent No.: US 12,789,407 B2
(45) Date of Patent: Nov. 10, 2026

(54) CIRCULAR SAW WITH A SHROUD

(71) Applicant: BLACK & DECKER INC., New Britain, CT (US)

(72) Inventors: Xiao Ya Du, Suzhou (CN); Chunlin Wu, Suzhou (CN); Panfei Tang, Suzhou (CN); Earnest N. Copeland, Jr., Perry Hall, MD (US); Floyd E. Moreland, IV, York, PA (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 17/881,146

(22) Filed: Aug. 4, 2022

(65) Prior Publication Data

US 2023/0037512 A1 Feb. 9, 2023

(30) Foreign Application Priority Data

Aug. 6, 2021 (WO) ................ PCT/CN2021/111187

(51) Int. Cl.
*B27G 19/04* (2006.01)
*B23D 47/12* (2006.01)
(Continued)

(52) U.S. Cl.
CPC ............. *B27G 19/04* (2013.01); *B23D 47/12* (2013.01); *B23D 59/0064* (2024.05); *B27B 9/02* (2013.01)

(58) Field of Classification Search
CPC ........ B27G 19/04; B27G 19/02; B27G 19/00; B23D 47/12; B23D 59/006; B27B 9/02
See application file for complete search history.

(56) References Cited

U.S. PATENT DOCUMENTS

| | | | | | |
|---|---|---|---|---|---|
| 2,861,607 | A * | 11/1958 | Emmons ................ | B27G 19/04 83/666 | |
| 5,140,754 | A | 8/1992 | Martenson | | |

(Continued)

FOREIGN PATENT DOCUMENTS

| | | | |
|---|---|---|---|
| CN | 1339345 | A | 3/2002 |
| CN | 1852785 | A | 10/2006 |

(Continued)

OTHER PUBLICATIONS

International Search Report and Written Opinion, PCT Application No. PCT/CN2021/111187, May 9, 2022, 8 pages, NIPA PRC.

(Continued)

*Primary Examiner* — Jonathan G Riley
(74) *Attorney, Agent, or Firm* — Michael Aronoff

(57) ABSTRACT

A cut off saw including a housing; a motor; a gear case, the gear case having an end face which extends from the side of the housing; an output spindle for a cutting blade which passes through and extends from the end face of the gear case which is rotationally driven by the motor when the motor is activated; a guard rotatably mounted on the end face of the gear case and which surrounds at least part of the periphery of a cutting blade when the cutting blade is mounted on the output spindle; a side wall of the guard faces the end face and includes a series of recesses which face towards the end face; the end face facing towards the side wall of the guard includes a series of projections which are capable of aligning with and engaging with the recesses.

14 Claims, 9 Drawing Sheets

(51) Int. Cl.

| | |
|---|---|
| ***B23D 59/00*** | (2006.01) |
| ***B27B 9/02*** | (2006.01) |

(56) References Cited

U.S. PATENT DOCUMENTS

| | | | | | |
|---|---|---|---|---|---|
| 6,949,017 | B2 | | 9/2005 | Koschel et al. | |
| 7,059,947 | B2 | | 6/2006 | Crover | |
| 7,131,897 | B2 | | 11/2006 | Crover | |
| 8,454,412 | B2 | | 6/2013 | Esenwein | |
| 8,523,640 | B2 | | 9/2013 | Esenwein | |
| 10,307,886 | B2 | | 6/2019 | Arthur et al. | |
| 10,406,718 | B2 | | 9/2019 | Arthur et al. | |
| 2006/0005401 | A1 | * | 1/2006 | Borinato | B27B 9/00 30/388 |
| 2007/0117499 | A1 | * | 5/2007 | Chen | B24B 23/028 451/451 |
| 2011/0283857 | A1 | | 11/2011 | Kani et al. | |
| 2013/0157550 | A1 | * | 6/2013 | Ikuta | B24B 23/028 451/451 |
| 2014/0080391 | A1 | | 3/2014 | Amend et al. | |
| 2019/0329337 | A1 | | 10/2019 | Owens et al. | |

FOREIGN PATENT DOCUMENTS

| | | | | | |
|---|---|---|---|---|---|
| CN | 201009014 | Y | | 1/2008 | |
| CN | 101745840 | A | | 6/2010 | |
| CN | 201711848 | U | | 1/2011 | |
| CN | 207372905 | U | | 5/2018 | |
| DE | 4423889 | C1 | * | 6/1995 | B23Q 11/06 |
| DE | 19914855 | A1 | | 10/2000 | |
| DE | 102008023324 | A1 | * | 11/2009 | B24B 23/028 |
| DE | 102008002548 | A1 | | 12/2009 | |
| DE | 102015204318 | A1 | | 9/2015 | |
| EP | 1759813 | A2 | | 3/2007 | |
| EP | 3556512 | A1 | | 10/2019 | |
| WO | WO-2009059838 | A1 | * | 5/2009 | B24B 23/028 |
| WO | 2020012746 | A1 | | 1/2020 | |

OTHER PUBLICATIONS

Extended European Search Report, EP Application No. 22183645.5, Jan. 11, 2023, 9 pages, EPO.

International Preliminary Report on Patentability, PCT Application No. PCT/CN2021/111187, Feb. 6, 2024, 5 pages, WIPO.

Office Action, CN Application No. 202180013135.X, Jun. 1, 2024, 7 pages, NIPA PRC.

Communication pursuant to Article 94(3) EPC, EP Application No. 22183645.5, Mar. 31, 2025, 7 pages, EPO.

Office Action, CN Application No. 202180013135.X, Mar. 18, 2025, 8 pages, NIPA PRC.

* cited by examiner

Item 2

CIRCULAR SAW WITH A SHROUD

RELATED APPLICATION

This application claims priority under 35 U.S.C. § 119(b) to PCT Application No. PCT/CN2021/111187, filed Aug. 6, 2021, titled “CIRCULAR SAW WITH A SHROUD.”

FIELD

The present invention relates to a circular saw and a shroud for a circular saw, and in particular, to an indexing mechanism for a pivotal guard mounted on a gear case of a circular saw and to a locking mechanism for locking a shroud onto a guard of a circular saw.

BACKGROUND

A typical design of circular saw comprises a housing in which is mounted an electric motor (which typically is powered by a mains AC power supply or a battery) which rotationally drives an output spindle via series of gears. A circular saw blade is mounted on the output spindle. A fixed guard is attached to the housing and surrounds the top half of the cutting blade. A flat rectangular base is attached to the bottom of the housing which comprises a rectangular aperture through which the bottom half of the blade projects. The underside of the base is slid along the surface of a work piece to be cut whilst the bottom half of the blade penetrates into and cuts through the work piece. A handle, with a trigger switch for activating the motor, is attached to the housing by which an operator manoeuvres the circular saw.

A cut off saw is a specific type of circular saw. A cut off saw is similar to a typical design of circular except that it does not comprises a base. Instead, the operator manually supports the cut off saw above the work piece to be cut whilst cutting the work piece. Often the shape and configuration of the housing of a cut off saw is designed so that the saw is easier to be manually supported and manoeuvred by the operator. One way of making a cut off saw more manoeuvrable is to mount the guard on the housing so that it can pivot around the output spindle.

A cut off saw can be utilised with a shroud which can be mounted on the guard so that it surrounds the guard and cutting blade, and which can then act in the same manner as a base on a typical design of circular saw.

US2019329337 shows a cut off saw with a shroud.

DISCLOSURE

Accordingly, there is provided a cut off saw. The cut off saw comprises a housing; a motor mounted within the housing; a gear case mounted on the housing, the gear case having an end face which extends from the side of the housing; an output spindle for a cutting blade which passes through and extends from the end face of the gear case which is rotationally driven by the motor when the motor is activated; a guard mounted on the end face of the gear case and which surrounds the output spindle and at least part of the periphery of a cutting blade when the cutting blade is mounted on the output spindle; wherein the guard is capable of being moved in a rotatable manner around the output spindle; wherein the guard is capable of being moved towards or away from the end face of the gear case in a direction parallel to the output spindle; wherein a biasing mechanism urges the guard towards the end face of the gear case in the direction parallel to the output spindle; wherein a side wall of the guard faces the end face and comprises a series of recesses which face towards the end face; wherein the end face facing towards the side wall of the guard comprises a series of projections which are capable of aligning with and engaging with the recesses; wherein the biasing force of the biasing mechanism urges the side wall of the guard towards the end face of the gear case so that the series of projections enter into the series of recesses when the projections and recesses are aligned; wherein the guard is capable of being moved away from the end face of the gear case against the biasing force of the biasing mechanism to disengage the projections from the recesses; wherein the guard is rotationally locked to the end face of the gear case when the series of projections are engaged with the series of recesses; wherein the guard can freely rotate on the end face of the gear case when the series of projections are disengaged from the series of recesses; wherein there is provided a plate attached to the end face of the gear case (64) facing the side wall of the guard and which is sandwiched between the end face and the side wall, wherein the series of projections are formed on the plate.

The provision of a plate, formed with the projections, on the end face of the gear case which is sandwiched between the end face and the side wall of the guard, enables different designs and sizes of guards to be mounted on the end face of the gear case with different sizes and locations of recesses by simply changing the plate without changing the gear case. This enable the design of the cut off saw to be easily modified by interchanging guards, rendering the cut off saw more manoeuvrable.

FIGURES

An embodiment of the invention will now be described with reference to following drawings of which:

Figure 5:
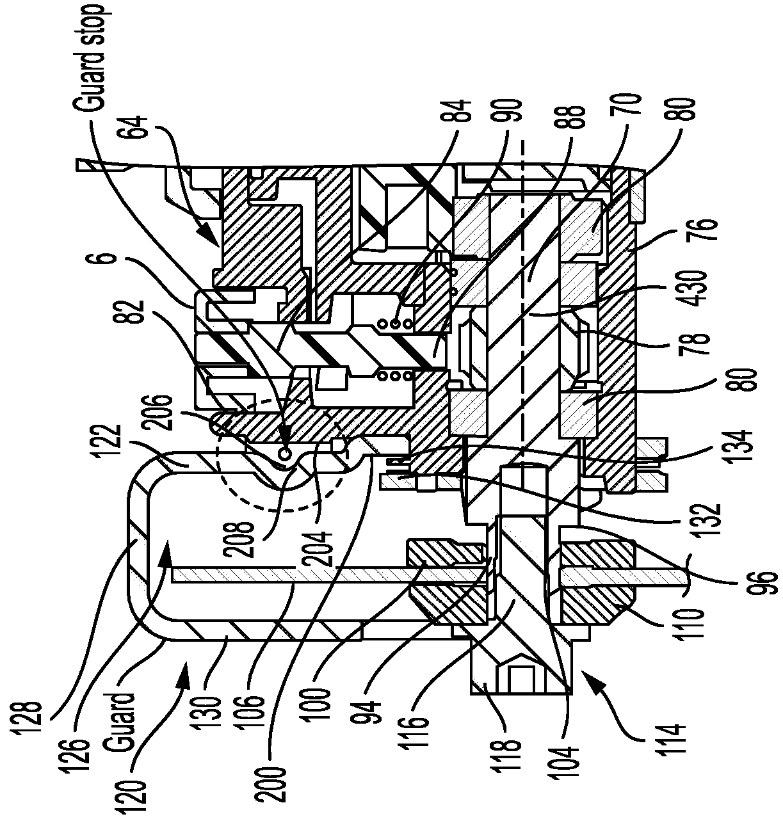

FIG. 5 sows a vertical cross section of part of the circular saw.

Figure 6:
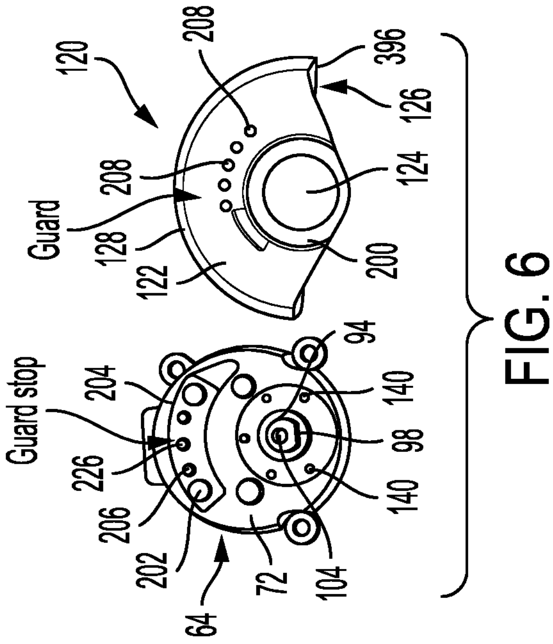

FIG. 6 shows a view of the base of the gear case and the side of the guard.

Figure 1:
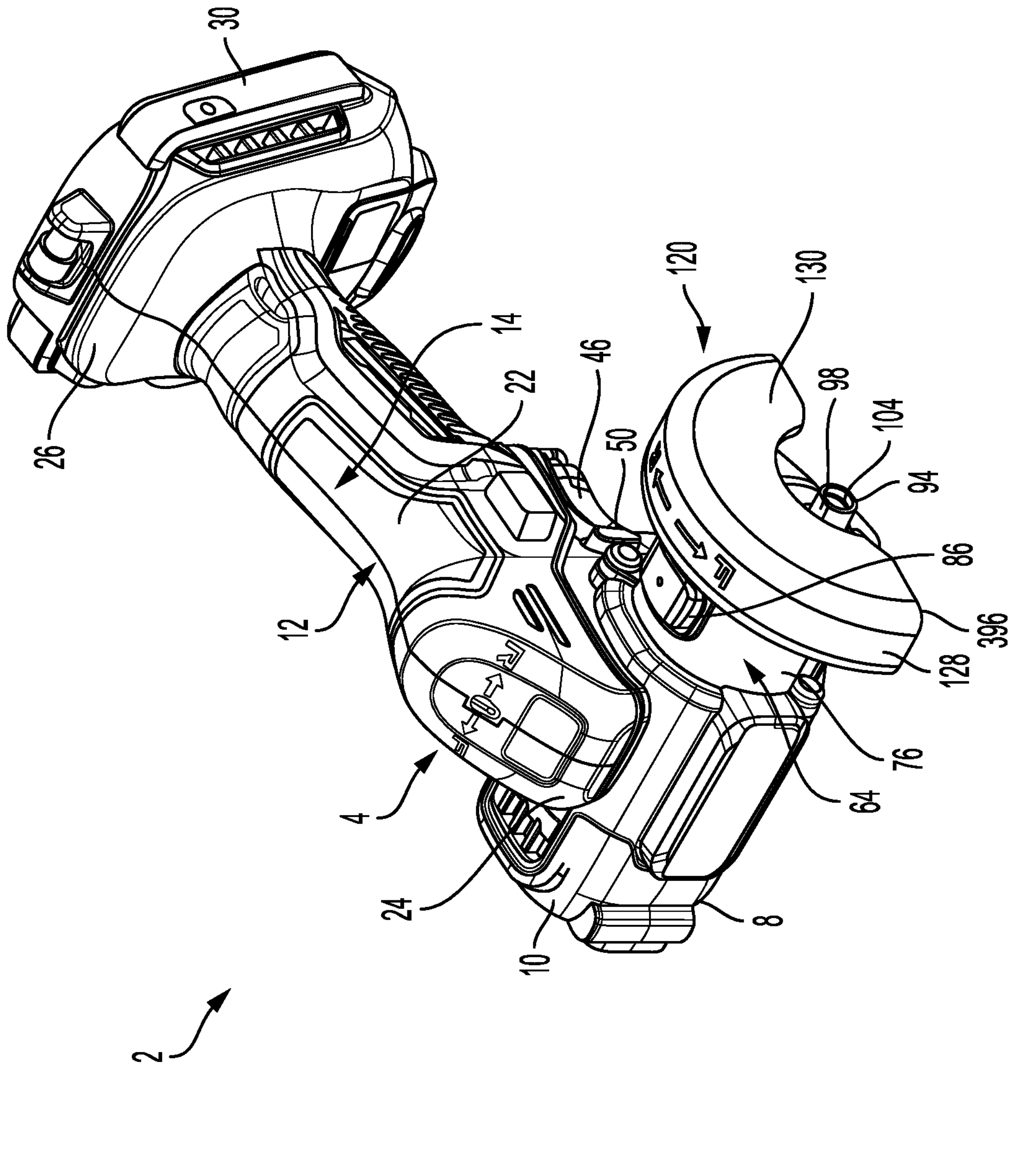
FIG. 1 shows a perspective view of a circular saw.
Figure 7:
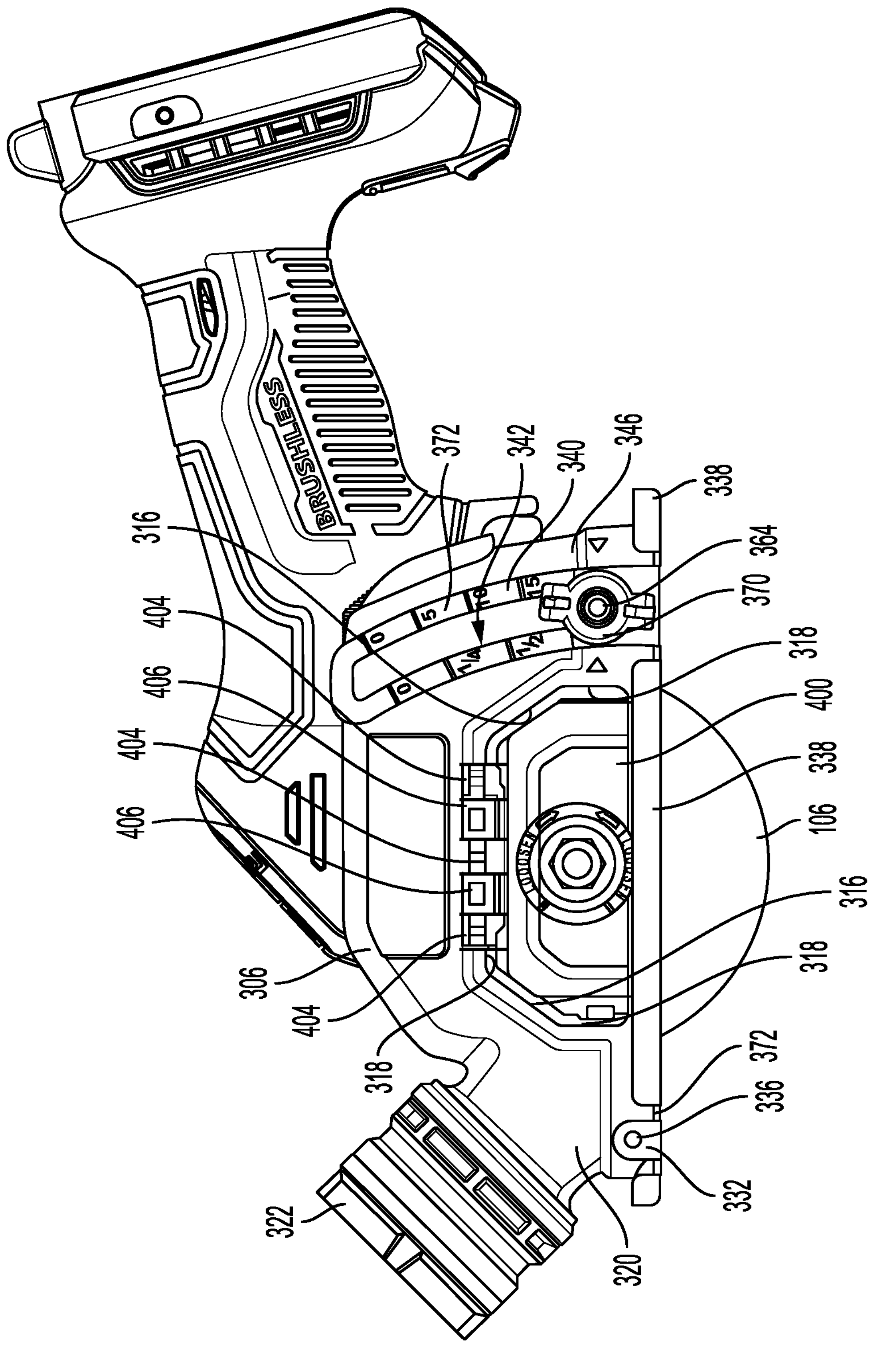

FIG. 7 shows a side view of the circular saw of FIG. 1 with a shroud mounted on the guard.

Figure 8:
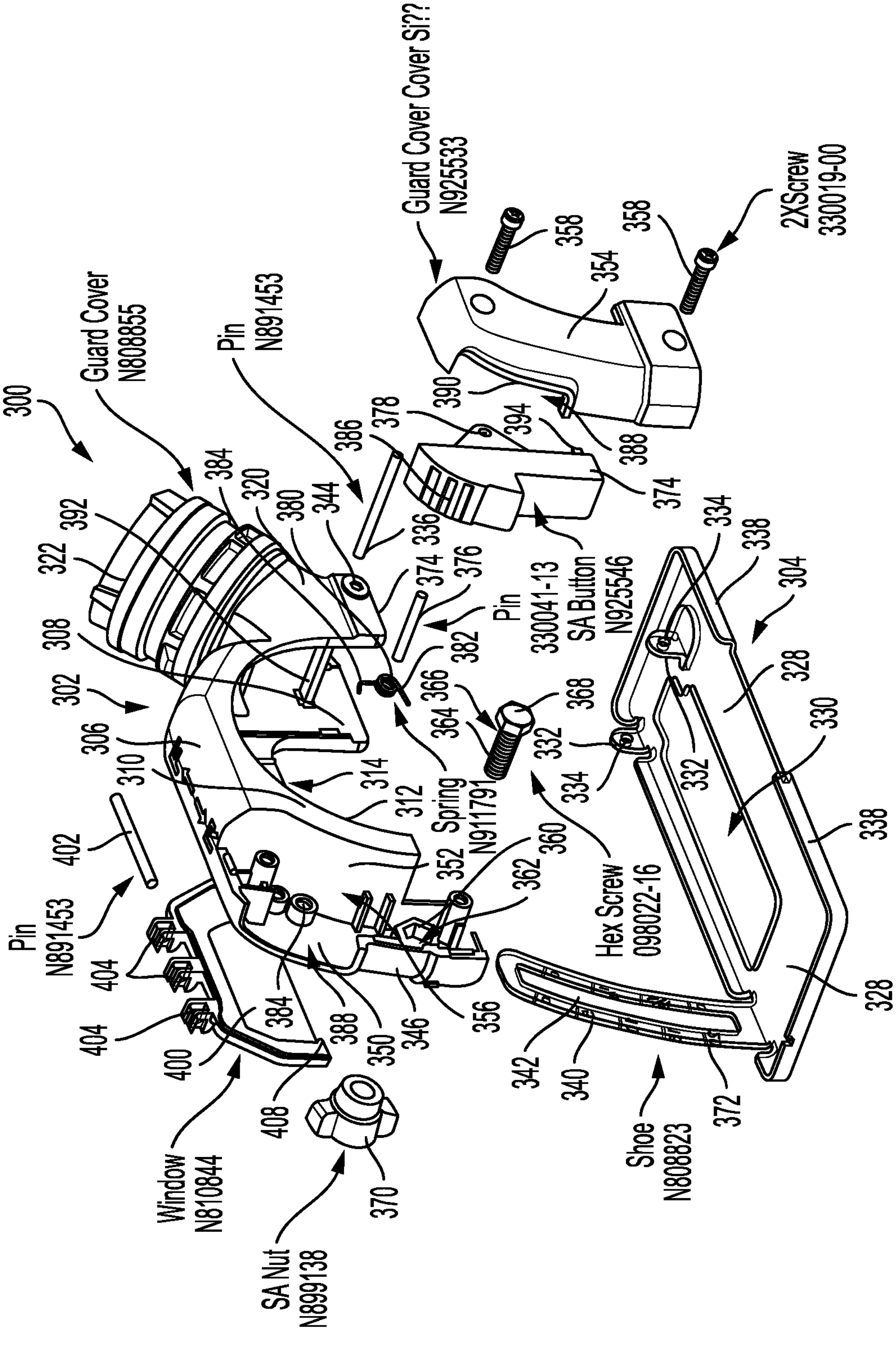

FIG. 8 shows an exploded view of the shroud.

Figure 9:
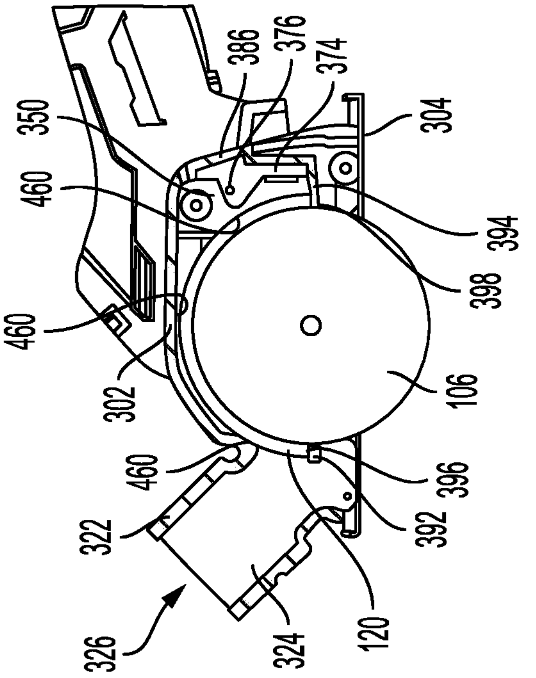

FIG. 9 shows a side view of the vertical cross section of the release switch of the shroud when mounted on the guard.

Figure 10:
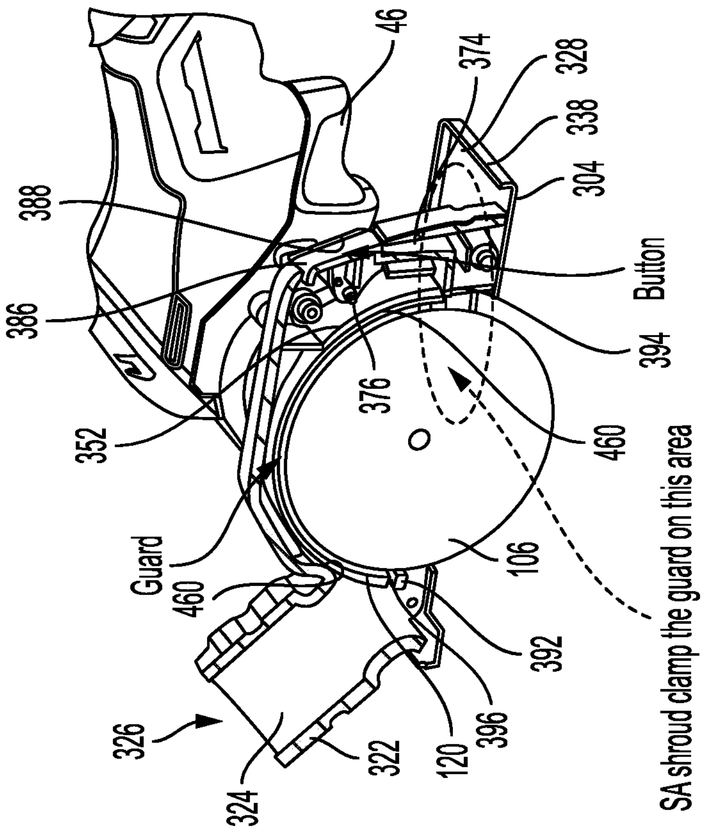

FIG. 10 shows a perspective view of a vertical cross section of the release switch of the shroud when mounted on the guard.

Figure 11:
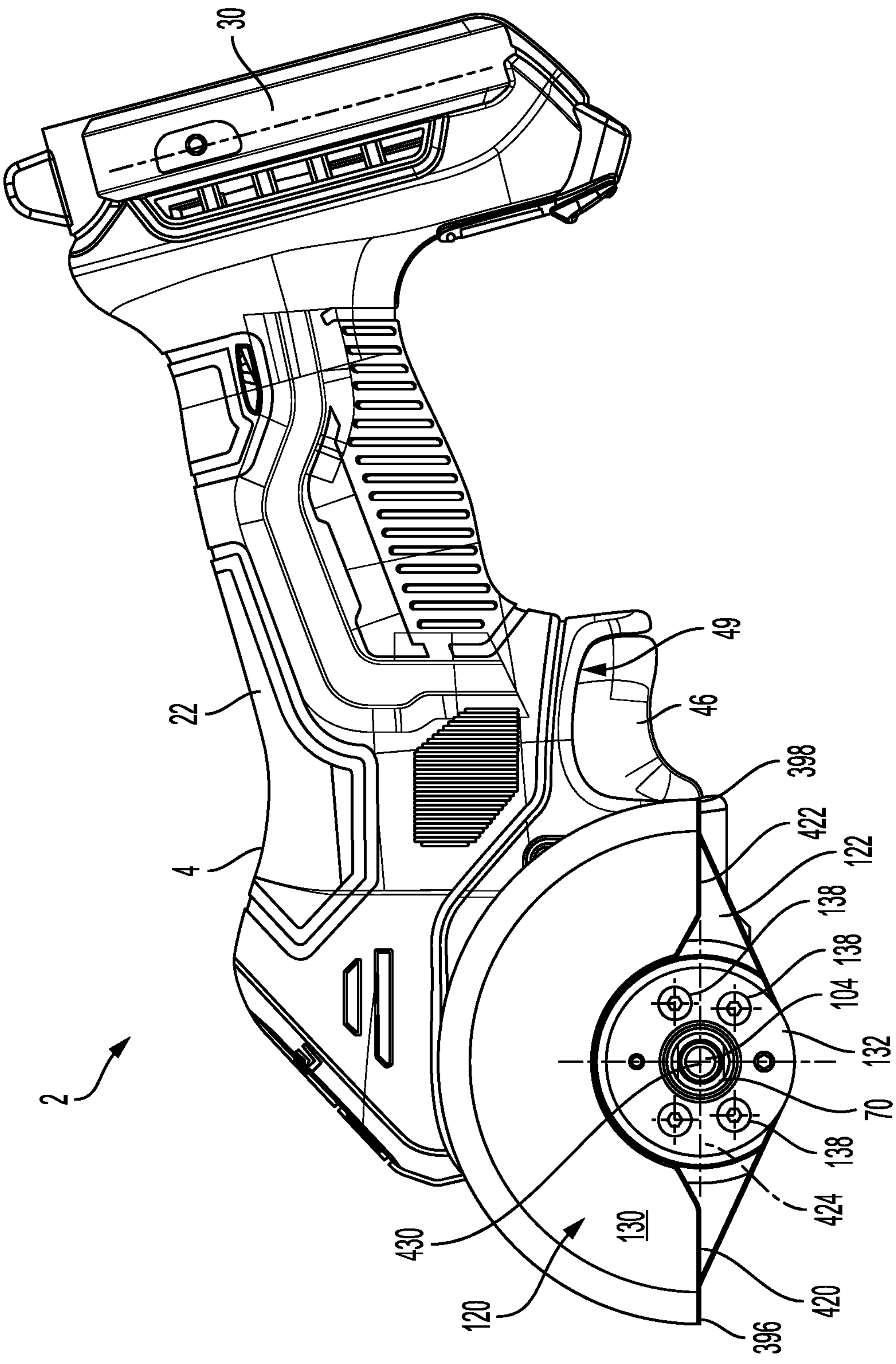

FIG. 11 shows a side view of the circular saw.

DESCRIPTION

Referring to FIGS. 1 to 4, the circular saw 2 comprises a housing 4 formed from four clam shells 8, 10, 12, 14 and a cup shaped gear case 64. Two clam shells 8, 10 are connected together using bolts 18 to create a tubular container which is open at one end 11 to form a motor housing 8, 10 to hold and surround a DC brushless motor 16. However, it will be appreciated that other types of electric motor could be used. The other two clam shells 12, 14 are connected together using bolts 20 to form a grip housing 12, 14. The grip housing 12, 14 has a central section 22 which forms a handle and two end sections 24, 26, one mounted on each end of the central section 22. The first end section 24 is shaped to received and support the motor housing 8, 10. The second end section 26 forms a mount with guide rails 28 to receive a sliding battery 30 in a well-known manner. The second end section 26 also has an opening for receiving a plate 34 on which is formed an electrical connector 36 which is capable of connecting to an electrical connector (not shown) mounted on the battery 30 when the battery 30 is mounted on the second end section 26.

A wire loom 38 electrically connects to the electrical connector 36 via a socket 40 mounted on the plate 34. The wire loom 38 extends into the grip housing 12, 14, through the central section 22 towards the first end section 24. Mounted in the grip housing 12, 14 in a region traversing the first end section 24 and central section 22 is an electronic control unit 42. The wire loom 38 extends inside of the grip housing 12, 14 from the socket 40 on the plate 34 to the electronic control unit 42.

The electronic control unit 42 comprises an electric switch 44 to which is connected a slidable trigger button 46. The trigger button 46 projects through an aperture 49 formed in a lower wall of the central section 22. When an operator grasps the handle formed by the central section 22, the finger of the operator is able to engage and depress the trigger button 46 in a well-known manner to activate the motor 16. Also connected to the electric switch 44 is a slide bar 48 which extends through the width of the electric switch 44. One end 50 of the slide bar 48 projects through an aperture formed in a side wall of the central section 22. The other end 52 of the slide bar 48 projects through another aperture formed in an opposite side wall of the central section 22 in a symmetrical manner to the first end 50. When an operator grasps the handle formed by the central section 22, the finger or thumb of the operator is able to engage one or the other end 50, 52 of the slide bar 48, to depress the slide bar 48 in a well-known manner in a first sideways direction or a second reverse direction to change the direction of rotation of the motor 16 when the motor 16 is activated.

Attached electrically to the top of the electronic control unit 42 is a circular PCB 54. The circular PCB 54 is located inside of the motor housing 8, 10 and is attached to the front of the motor 16 by being mechanically and electrically sandwiched between the front of the motor 16 and an adaptor 56. The PCB 54 provides the electrical power and communications to the motor 16 from the electronic control unit 42 in order for the electronic control unit 42 to rotationally drive the motor 16. The PCB 54 and adapter 56 comprise aligned central apertures through which a pinion 58, rigidly mounted on the output spindle 68 of the motor 16, can extend.

Mounted on the front of the second end section 26 is a rectangular PCB 60 which is electrically connected to the electronic control unit 42. Mounted on the rectangular PCB 60 is an LED 61 and a lens 62. The LED 61 and lens 62 form a light which is driven by the electric control unit 42 and which is capable of illuminating the surface of a work piece.

The cup shaped gear case 64 is mounted onto and surrounds the end of the motor 16 using three bolts 66. The gear case 64 encloses the PCB 54 and the adapter 56. A series of spur gears (not shown) are mounted inside of the gear case 64. The pinion 58 meshes with the spurs gears which in turn rotationally drive an output spindle 70 which extends from the end face 72 of the base of the gear case 64. An O ring 74 is sandwiched between the adapter 56 and an internal wall (not shown) of the gear case 64. Whilst the embodiment comprises spur gears by which the motor drives the output spindle 70, it will be appreciated that the motor could directly drive the output spindle without the use of any gears, the gear case 64 simply surrounding the end of the motor.

When the gear case 64 is mounted on the motor 16, the end section 76 of the cup shaped gear case 64, with the end face 72, extends from the opening 11 of the motor housing 8, 10 formed by the two clam shells 8, 10. The output spindle 70 passes internally through the end section 76 of the cup shaped gear case 64 prior to extending externally through the end face 72 of the base which is located outside of the housing 8, 10. Inside of the gear case 64, a toothed cog 78 is mounted on the spindle 70 between two support bearings 80 inside of the end section 76 of the gear case 64 (see FIG. 5). Formed through the side of the end section 76 of the gear case 64 is an aperture 82. A locking rod 84, supported by the gear case 64 in a direction perpendicular to the spindle 70, extends at one end through the aperture 82. A button 86 is attached to the external end of the locking rod 84 which is accessible from outside of the gear case 64 by an operator. The internal end 88 is shaped so as to be able to engage the teeth of the toothed cog 78. The locking rod 84 is slidable between a first outer position where the internal end 88 is disengaged from the toothed cog 78 and a second inner position where the internal end 88 engages the toothed cog 78. When the locking rod 84 is in its second position, the output spindle 70 is prevented from rotating. A spring 90 biases the locking rod 84 to its first position. The locking rod 84 can be moved to its second position from its first by depression of the button 86 by an operator. The locking rod 84, toothed cog 78, spring 90 and button 86 form a spindle lock for the output spindle 70.

A cutting blade 106 can be attached to the end 94 of the output spindle 70. The end 94 is formed with a reduced diameter when compared to the rest of the output spindle 70, a shoulder 96 separating the end 94 and the rest of the output spindle 70. The external surface of the end 94 comprises two flat surfaces 98. Formed in the end 94 is a threaded bore 104, the longitudinal axis of which is aligned with the longitudinal axis 430 of the output spindle 70.

An inner flange 100 is mounted on the end 94 of the output spindle 70. The inner flange 100 has an aperture 102 with an inner diameter which is slightly larger than the end 94 but less than the rest of the output spindle 70 so that it slides onto the end 94 and abuts against the shoulder 96. The aperture 102 comprises two flat surfaces which engage with the flat surfaces 98 on the end 94. The flat surfaces 98 on the end 94 and the inner flange 100 rotationally lock the inner flange 100 to the end 94 of the output spindle 70 so that rotation of the output spindle 70 results in rotation of the inner flange 100.

The cutting blade 106 is then mounted on the end 94 of the output spindle 70 so that it abuts against the side of the inner flange 100.

An outer flange 110 is then mounted on the end 94 of the output spindle 70 so it abuts against the cutting blade 106. The outer flange 110 has an aperture 112 with an inner diameter which is slightly larger than the end 94 but less than the rest of the output spindle 70 so that it slides onto the end section 94 and abuts against the cutting blade 106. The aperture 112 comprises two flat surfaces which engage with the flat surfaces 98 on the end 94. The flat surfaces 98 on the end 94 and the outer flange 110 rotationally lock the outer flange 110 to the end 94 of the output spindle 70 so that rotation of the output spindle 70 results in rotation of the outer flange 110.

A threaded shaft 116 of a bolt 114 is then screwed into the threaded bore 104 so that the head 118 of the bolt 114 abuts against the side of the outer flange 110. The bolt 114 is screwed into the threaded bore 104 until the outer flange 110, the blade 106 and the inner flange 100 are tightly pushed up against the shoulder 96 so that the blade 106 is frictionally gripped by the inner and outer flanges 100, 110 so that rotation of the output spindle 70 results in rotation of the blade 106.

A guard 120 is rotatably mounted on the end face 72 of the base of the gear case 64 so that it positioned adjacent the end face in a moveable manner. The guard 120 comprises an inner side wall 122 with a circular aperture 124 formed through it. A circular recess 200 is formed in the inner side wall 122 around the circular aperture 124.

Attached to the outer edge of the inner side wall 122 is a curved trough 126 having a base 128 and two side walls 130 (the inner one being formed by the outer edge of the inner side wall 122). The outer side wall 130 comprises a forward lower edge 420 and a rearward lower edge 422 where the outer side wall 130 ends as best seen in FIG. 11. The forward lower edge 420 and the rearward lower edge 422 are both straight and aligned with each other along an axis 424. The base 128 comprises a lower front edge 396 and a lower rear edge 398 where the base 128 ends. The lower front edge 396 is straight and meets with the forward lower edge 420 of the outer wall 130. The lower rear edge 398 is straight and meets with the rearward lower edge 422 of the outer wall 130. When the guard 120 is mounted on the end face 72 of the base of the gear case 64, the inner side wall 122 abuts against the end face 72 whilst the curved trough 126 surrounds the edge of the top half of the cutting blade 106 as best seen in FIG. 5. When the guard 120 is mounted on the end face 72 of the base of the gear case 64 in the normal manner, the longitudinal axis 430 of the output spindle 70 is perpendicular to and intersects the axis 424 of the lower front edge 420 and lower rear edge 422 as best seen in FIG. 11. When the guard 120 is positioned adjacent the end face 72 of the base of the gear case 64 in the normal manner, the longitudinal axis 430 of the output spindle 70 is parallel to both the lower front edge 396 and the lower rear edge 398, the longitudinal axis 430, the lower front edge 396 and the lower rear edge 398 being located in the same plane.

The guard 120 is attached to the end face 72 using a washer 132 and a wavy spring 134 in such a manner that the position of the guard 120 relative to the end face 72 is maintained using the washer 132 and the wavy spring 134. The diameter of the whole of the wavy spring 134 is greater than that of the circular aperture 124. The diameter of the outer periphery of the washer 132 is greater than that of the circular aperture 124. The diameter of the inner periphery of the washer 132 is less than that of the circular aperture 124. Four holes 136 are formed though the washer 132 which are located of a circumferential path around the washer 132 in a symmetrical manner. The diameter of the circumferential path is less than that of the circular aperture 124. When the guard 120 is located adjacent the end face 72 of the base of the gear case 64, the washer 132 and the wavy spring 134 are located against the inner side wall 122 of the guard 120 in the recess 200 in such a manner that the wavy spring 134 is sandwiched between the washer 132 and the inner side wall 122 and the inner side wall 122 is sandwiched between the end face 72 and the wavy spring 134. A shaft of a bolt 138 is then passed through each of the holes 136 and screwed into threaded bores 140 formed in the end face 72 of the gear case 64 until the head of the bolts 138 abut against the washer 132. The shafts of the bolts 138 pass through the inside of the wavy spring 134 and through the circular aperture 124 in the inner side wall 122 of the guard 120. The bolts 138 are screwed into the threaded bores 140 until the inner side wall 122 surrounding the circular aperture 124 is sandwiched between the wavy spring 134 and end face 72 of the gear case 64 with the wavy spring 134 being compressed whilst it is sandwiched between the inner side wall 122 and the washer 132. The compressed wavy spring 134 provides a biasing force urging the inner side wall 122 into frictional engagement with the end face 72 of the gear case 64. The amount of biasing forcing is sufficient to hold the guard 120 stationary on the end face 72 until an external force is applied to the guard 120 (for example by the hand of the operator). When a sufficient angular force is applied, the guard 120 is able to overcome the frictional contact and rotate, the movement being controlled by the washer 132 and the wavy spring 134 being located in the circular recess 200 which restricts the movement of the guard 120 on the end face 72 of the gear case 64 to a rotational movement around the output spindle 70.

Attached to the end face 72 of the gear case using bolts 202 is an arcuate plate 204 which extends partly around the output spindle 70. The arcuate plate 204 is sandwiched between the end face 72 and the inner side wall 122 of the guard 120. Three semi-spherical projections 206 extend from the side of the arcuate plate 204. The semi-spherical projections 206 are located equidistantly on a circumferential path which extends around the longitudinal axis 430 of the output spindle 70. Formed in the surface of the inner side wall 122 of the guard 120, facing the end face 72, are a series of five semi-spherical recesses 208. The semi-spherical recesses 208 are located equidistantly on a circumferential path which extends around the longitudinal axis 430 of the output spindle 70, the radius of the circumferential path being the same as the circumferential path of the semi-spherical projections 206, the distance between adjacent semi-spherical recesses 208 being the same as that of the semi-spherical projections 206 so that the projections 206 and recesses 208 are capable of being aligned when the guard 120 is rotated to an appropriate angular position. The size of the semi-spherical recesses 208 are all the same and correspond to the size of the semi-spherical projections 206 which are also the same size so that the projections 206 are capable of engaging with and entering into the recesses 208.

The inner side wall 122 is arranged so that when the guard 120 is mounted on the end face 72, the inner side wall 122 is flush with the end face 72. As such, when the projections 206 are aligned with the recesses 208, the projections 206 engage with and enter into the recesses 208 and hold the guard 120 in its angular position. The inner side wall 122 can be manufactured so that it is resiliently deformable in a sideways direction, parallel to the longitudinal axis 430 of the output spindle 70. When an external force is applied to the guard 120, the resilient nature of the inner side wall 122 allows the inner side wall 122 to be bent in a direction away from the end face 72, the trough 126 moving away from the gear case 64 as it does so. Once the force is removed, the resilient nature of the inner side wall 122 urges it to move back towards the end face 72, the trough 126 moving back towards the gear case 64 as it does so.

The projections 206 and the recesses 208 enable the guard 120 to be located in pre-set angular positions. When the projections 206 and the recesses 208 are aligned, the projections 206 engage with and enter the recesses 208 to hold the guard 120 in a pre-set angular position. The location of the projections 206 on the end face 72 of the gear case 64 are arranged such that the guard 120 can be located at a desired angular position. The guard 120 can be moved by applying a force to the guard 120. When a sufficient tangential force is applied to the guard 120, the projections 206, due to their semi-spherical shape, act as a cam and ride out of the recesses 208, which act as cam followers, causing the whole of the guard 120 to move away from the end surface 72 of the gear case 64 due to the compression of the wavy spring 134. In addition or alternatively, the inner side wall 122 can bend away from the end surface 72 of the gear case 64 against the resilient force of the end side wall 122. Once the semi-spherical projections 206 are located outside of the recesses 208, due to the movement of the whole guard 120 due to the compression of the wavy spring 134 and/or the bending of the inner side wall 122 away from the end face 72 of the gear case 64, the guard 120 is able to be angularly moved, by overcoming the frictional contact between the end face 72, the semi-spherical projections 206 and the inner side wall 122, caused by the biasing force of the washer 132 and the wavy spring 134, around the output spindle 70. When the recesses 208 again align with the projections 206, the projections 206 engage with and enter the recesses 208 due to the biasing force of the wavy spring 134 and/or the inner side wall 122, locking the guard 120 into another pre-set angular position.

Figure 2:
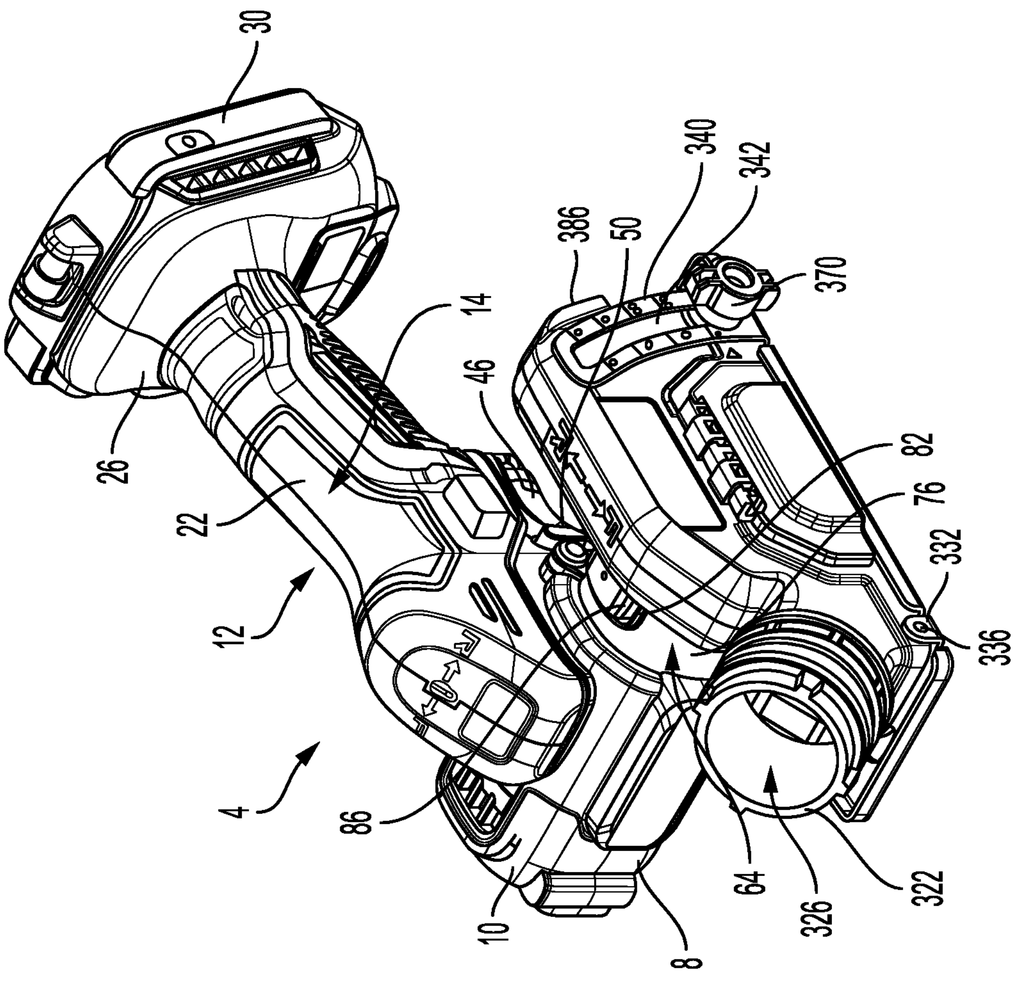
FIG. 2 shows a perspective view of the circular saw of FIG. 1 with a shroud mounted on the guard.
Figure 3:
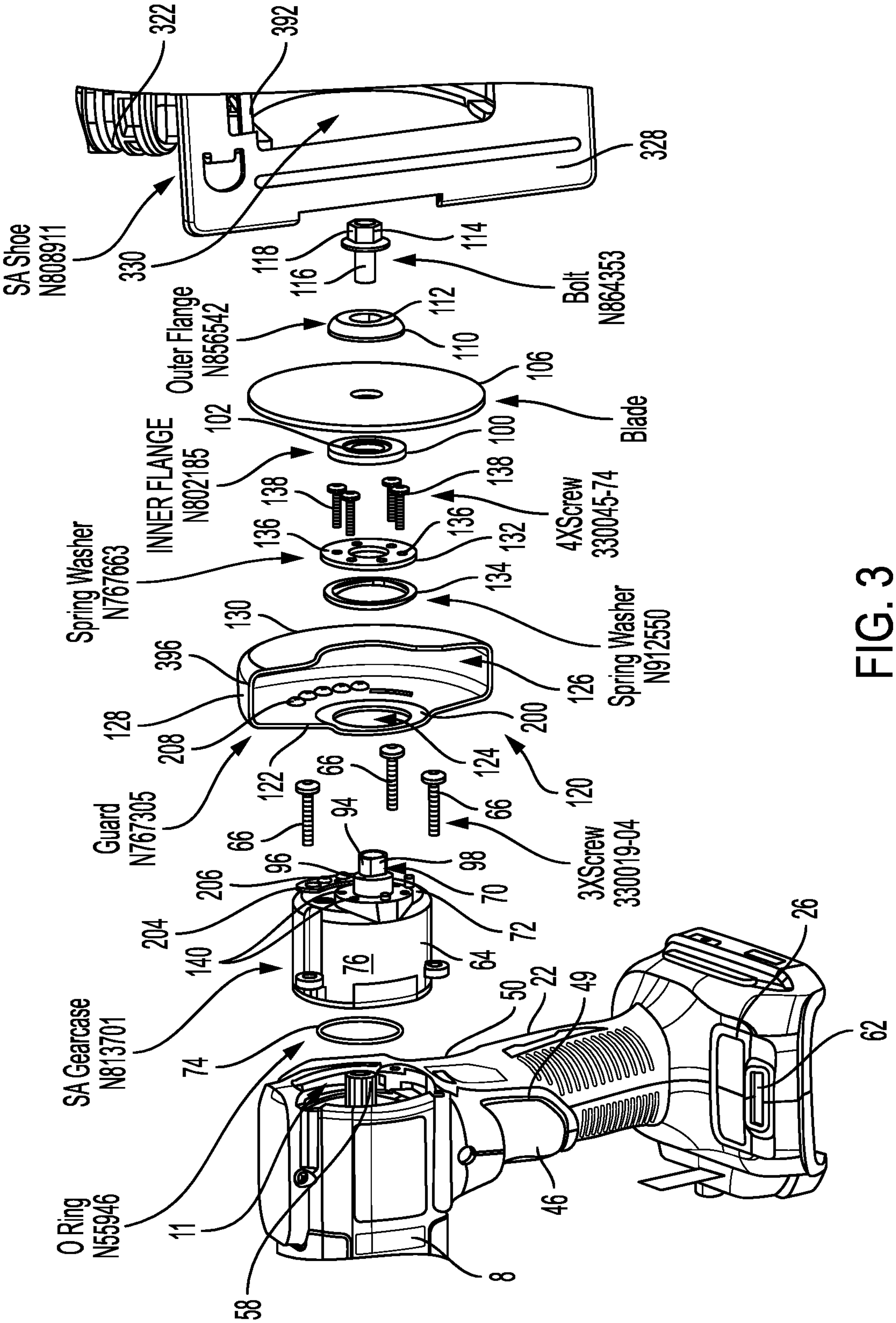
FIG. 3 shows a first exploded view of the circular saw with the shroud.
Figure 4:
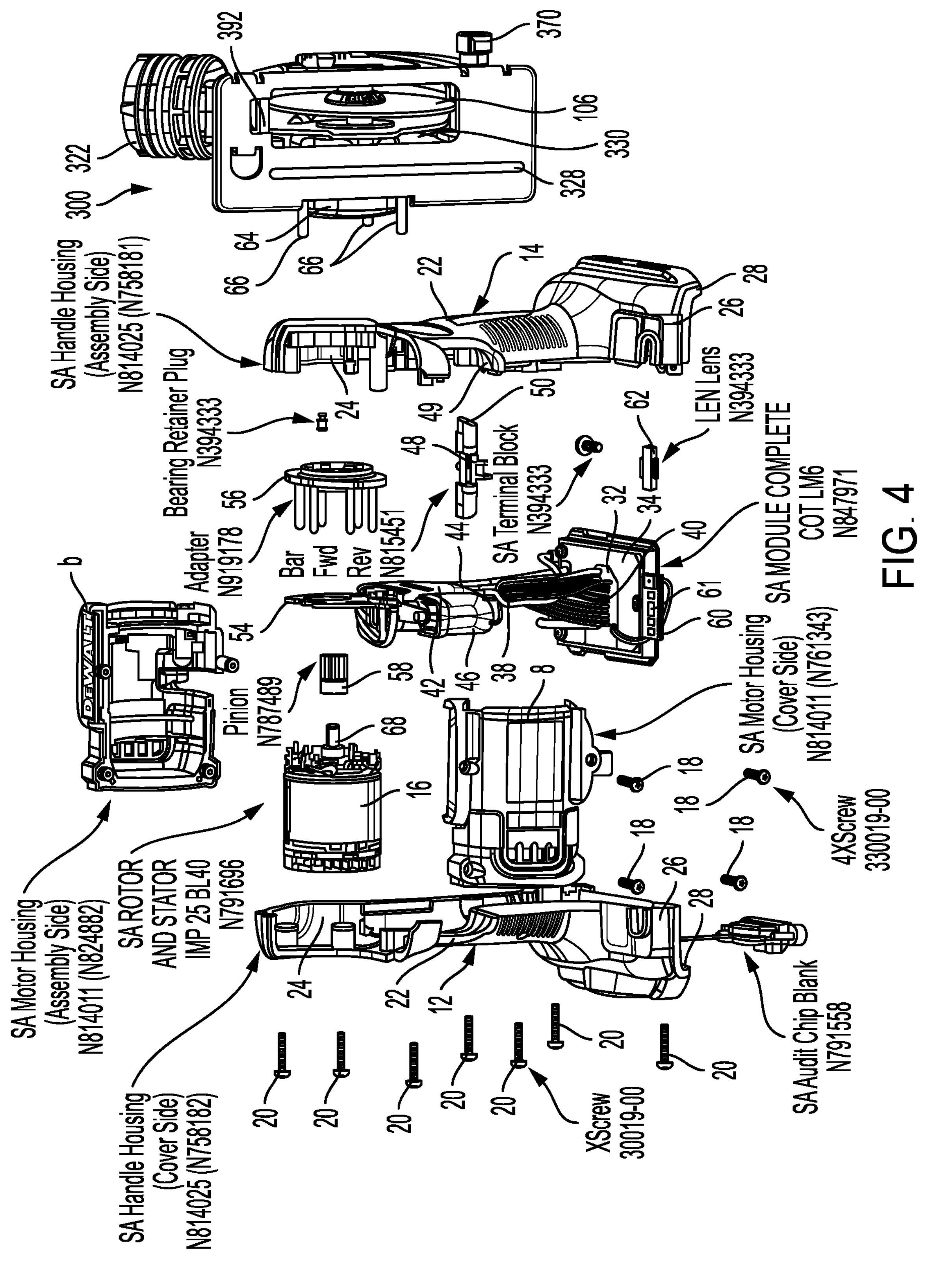
FIG. 4 shows a second exploded view of the circular saw with the shroud.

A shroud 300 can be mounted onto the guard 120 as shown in FIGS. 2 and 7. An exploded view of the shroud 300 can be seen in FIG. 8. The shroud 300 comprises a main housing 302 pivotally mounted on a base plate 304. When a shroud 300 is mounted on the circular saw, the base plate 304 can be located against a workpiece in order to control the depth of cut of the saw blade 106 on the work piece in well-known manner. The ability to pivot the main housing 302 on the base plate 304 enables the depth of cut of the cutting blade 106 to be adjusted in a well-known manner.

The main housing 302 comprises a curved shroud trough section 306 having an outer shroud wall 308 on one side and a smaller inner shroud wall 310 on the other side. The shroud trough section 306 is sufficiently large to be able to enclose the whole of the guard 120 inside of it. The inner shroud wall 310 has a curved edge 312 which rests of the end section 76 of the gear case 64 when the shroud 300 is mounted on the guard 120, the radius of the curved edge 312 corresponding to the radius of the outer surface of the end section 76 of the gear case 64. The outer shroud wall 308 has a hole 314 formed through it which is rectangular in shape with the top corners 316 formed at an angle to the sides 318 of the hole 314. Formed at the front 320 of the main housing 302 is a tubular pipe 322 which extends forward and upwards at a 45-degree angle. The tubular pipe 322 forms a passageway 324 which connects between a front opening 326 and the space inside of the trough section 306. The tubular pipe 322 can be connected to a hose (not shown) of a vacuum cleaner (not shown) in a well-known manner.

The base plate 304 comprises a flat rectangular section 328 with a rectangular aperture 330 formed through the center of it. The rectangular aperture 330 is sufficiently large to allow the guard 120 of the circular saw to pass through it. Located at the rear of the rectangular aperture 330 are two pivot supports 332 in symmetrical fashion. The pivot supports 332 each comprise a support hole 334 though which a pivot pin 336 can pass. Formed around a large portion of the periphery of the flat rectangular section 328 is vertical wall 338 which extends in a perpendicular direction to the plane of the flat rectangular section 328. The vertical wall 338 is a constant height along its length.

Formed at the front corner of the flat rectangular section 328 is an arcuate height adjustment plate 340 which extends upwardly and rearwardly in a curved manner in a vertical plane which extends in forward/rearward direction, perpendicularly to the longitudinal axis of the pivot pin 336. The arcuate height adjustment plate 340 is of uniform thickness and width along its length. An arcuate slot 342 is formed along the length of the arcuate height adjustment plate 340 in the middle of the arcuate height adjustment plate 340 and which is surrounded by the arcuate adjustment plate 340. The arcuate slot 342 has a constant width along its length. The radius of curvature of the arcuate height adjustment plate 340 and the arcuate slot 342 is centered around the longitudinal axis of the pivot pin 336.

The base plate 304 is pivotally mounted on the main housing 302 by the pivot pin 336 passing through and locating within two aligned holes 344 formed in the front 320 of the main housing 302 and the support holes 334 of the pivot supports 332.

Formed in the rear 346 of the main housing 302 by an external wall 350 of the main housing 302, an internal wall 352 and a switch chamber cover 354, is a switch chamber 356. The switch chamber cover 354 is attached to the side of the main housing 302 to form the switch chamber 356 by two bolts 358.

A hexagonal recess 360 is formed in the external wall 350 of the switch chamber 356 towards the front corner of the switch chamber 356. A hole 362 is formed through the base of the hexagonal recess 360 which passes through the wall 350 and provides a passageway between the hexagonal recess 360 and the external space surrounding the shroud 300. A shaft 364 of a height adjustment bolt 366 passes through the hole 362 in the wall 350 and extends externally of the main housing 302, the hexagonal head 368 of the bolt 366 locating within the hexagonal recess 360. The hexagonal recess 360 holds the head 368 of the bolt 366, and hence the shaft 364, stationary relative to the main housing 302, preventing rotation of the bolt 366 relative to the main housing 302. The shaft 364 of the bolt 366 extends through the arcuate slot 342 of the arcuate height adjustment plate 340. A plastic nut 370 screws onto the end on the shaft 364 and is capable of sandwiching the arcuate height adjustment plate 340 between the nut 370 and the side of the main housing 302 to frictionally grip the arcuate height adjustment plate 340 between the nut 370 and the main housing 302 to lock its position relative the main housing 302.

When the main housing 302 is pivotally attached to the base plate 304, the angle of the base plate 304 relative to the main housing 302 can be adjusted in a well-known manner. In order to adjust the angle of the base plate 304, the nut 370 is unscrewed slightly along the shaft 364 of the height adjustment bolt 366. This releases the frictional grip between the arcuate height adjustment plate 340 and the main housing 302. The main housing 302 can be pivoted about the pivot pin 336 relative to the base plate 304 to the desired angle. The plastic nut 370 is then screwed along the shaft 364 to sandwich the arcuate height adjustment plate 340 between the nut 370 and the side of the main housing 302 to frictionally grip the arcuate height adjustment plate 302 between the nut 370 and the main housing 302 to lock the angular position of the base plate 304 relative the main housing 302. Marked along the side of the arcuate height adjustment plate 340 are reference numbers 372 which indicate the angle of the base plate 304 relative to the main housing 302 when the nut 370 is aligned with a particular reference number 372.

When the main housing 302 is pivoted to its lowest position on the base plate 304, the lower edge 374 of the main housing 302 engages the top surface of the flat rectangular section 328 immediately inside of the vertical wall 338 as shown in FIG. 7.

Mounted inside of the switch chamber 356 is a switch lever 374 which forms a release switch for the shroud 300. The switch lever 374 is mounted on a switch pivot pin 376 which passes through a switch aperture 378 formed through the switch lever 374. A helical spring 380 wraps around the switch pivot pin 376 with a first end 382 connected to the switch lever 374 and a second end 384 connected to the wall 350 within the switch chamber 356. The switch pivot pin 376 engages at one end with a first circular recess 384 formed in the wall 350 of the switch chamber 356 and at the other end with a second inner recess (not shown) formed on an inner wall of the switch chamber cover 354. The switch lever 374 comprises a finger pad 386 formed on a top part of the switch lever 374 (above the switch aperture 378) which can be engaged by the fingers of the operator. A switch aperture 388 is formed on the rear 346 of the main housing 302 between the wall 350 of the main housing 302 and an edge 390 of the switch chamber cover 354. When the switch lever 374 is mounted inside of the switch chamber 356, the finger pad 386 can extend through the switch aperture 388 so that is accessible by an operator. The helical spring 380 biases the switch lever 374 in a direction so that finger pad 386 is biased to its most outwardly position through the switch aperture 388. Depression of the finger pad 386 by the operation pushes the finger pad 386 into the aperture 388 against the biasing force of the spring 380.

The switch lever 374 is mounted inside of the switch chamber 356 by first removing the switch chamber cover 354 to open the switch chamber 356. The helical spring 380 is mounted on the switch pivot pin 376 and then the switch pivot pin 376 is passed through the switch aperture 378 of the switch lever 374 with one end of the helical spring 380 being attached to the switch lever 374. Then the switch lever 374, helical spring 380 and switch pivot pin 376 are located inside of the switch chamber 356, with one end of the switch pivot pin 376 being located in the first circular recess 384 in the wall 350 of the switch chamber 356. The other end of the spring 380 is attached to the wall 350. The switch chamber cover 354 is placed on the main housing 302 with the second end of the pivot pin 376 located in the second recess on the inner wall of the switch chamber cover 354, the switch chamber cover 354 being secured to the main housing 302 using the two bolts 358.

The main housing 302 is made from molded plastic. The base plate 304 is made from a single piece of sheet metal with the arcuate height adjustment plate 340, the vertical wall 338 and the pivot supports 332 being made by stamping out the shape in a sheet of metal and then bending the sheet metal to the appropriate positions.

Mounted inside of the front 320 of the main housing 302 (as shown in FIG. 8), in a width wise direction (parallel to the pivot pin 336 and the plane of the flat rectangular section 328 of the base plate 304 (regardless of its angular position to the main housing 302), and also perpendicular to the plane of the blade 106 when the shroud 300 is mounted on the circular saw), is a cross bar 392. The cross bar 392 is made from metal (or another suitable hard material) and is square in cross section. The ends of the cross bar 392 are located in recesses in the internal walls of the main housing 302, the plastic main housing 30 being molded around the ends of the cross bar 392.

Integrally formed with the switch lever 374, on a lower end of an internal surface of the switch lever 374, is a peg 394. The peg 394 extends from the lower end (below the switch aperture 378) of the internal surface of the switch lever 374 towards the cross bar 392, perpendicularly to the pivot pin 376, (at a generally horizontal but slightly downward extending direction when the peg 394 is in its inner most position closest to the blade 106, as shown in FIG. 9). The peg 394 extends inwardly and perpendicularly to the switch pivot pin 376, towards the blade 106 and parallel to the plane of the blade 106 when the shroud 300 is mounted on the circular saw. Pivotal movement of the switch lever 374 results in pivotal movement of the peg 394 towards or away from the blade 106 when the shroud is mounted on the circular saw. The spring 380 biases the peg 394 to its closest position towards the blade 106 (when the shroud 300 is mounted on the circular saw). Depression of the finger pad 386 by the operator to push the finger pad 386 into the aperture 388 against the biasing force of the spring 380 results in the peg 394 pivoting from its closest inner position towards the blade 106 to its furthest outer position away from the blade 106.

In order to mount the shroud 300 on the circular saw, the shroud 300 is placed above the guard 120 with the base plate 304 facing the top of the guard 120. The top of the guard 120 is then moved towards the base plate 304 so that it initially enters into and passes through the rectangular aperture 330 formed through the center of the flat rectangular section 328 of the base plate 304. The remainder of the guard 120 is then passed through the rectangular aperture 330 so that the guard 120 locates inside of the curved shroud trough section 306 with the blade 106 extending from the guard 120 through the rectangular aperture 330. As the guard 120 is passed through the aperture 330, the operator depresses the finger pad 386 into the aperture 388 against the biasing force of the spring 380 to pivot the switch lever 374 and move the peg 394 from its closest inner position to its furthest outer position. This allows the guard 120 to pass the peg 394 without engaging the peg 394. When the guard 120 is located completely inside of the curved shroud trough section 306, movement of the guard 120 within the curved trough section 306 is limited. The external walls of the guard 120 engage with the internal walls 460 of the curved trough section 306 so that the guard 120 can only move in a rotational direction around the axis 430 of rotation of the output spindle 70 and blade 106. All other types of linear and rotational movements are prevented by the engagement of the external walls of the guard 120 engaging with the internal walls 460 of the curved trough section 306. The guard 120 is then manoeuvred inside of the shroud by movement of the guard 120 in a rotational direction around the axis 430 of rotation of the output spindle 70 and blade 106 until the cross bar 392 is located below the lower front edge 396 of the guard 120 towards the front of the guard 120, the front section of the guard 120 with the front edge 396 being surrounded and held by the cross bar 392 and the internal walls 460 of the front 320 of the trough section 306 of the main housing 302 of the shroud 300. Whilst the guard 120 is fully enclosed within the shroud 300, the operator then releases the finger pad 386, allowing the biasing force of the spring 380 to pivot the switch lever 374 and move the peg 394 from its furthest outer position to its closest inner position. When the peg 394 locates in its closest inner position, the peg 394 is located below the lower rear edge 398 of the guard 120 towards the rear of the guard 120, the rear section of the guard 120 with the rear edge 398 being surrounded and held by the peg 394 and the internal walls 460 of the rear of the trough section 306 of the main housing 302 of the shroud 300. Whilst the peg 394 remains in this position, the guard 120 is prevented from moving in a linear direction which is perpendicular to the axis 430 of rotation of the output spindle 70 and the blade 106 or in a rotational direction around the axis 430 of rotation of the output spindle 70 and the blade 106 and as such is rigidly locked to the guard 120 of the circular saw.

In order to remove the shroud 300 from the circular saw, the operator depresses the finger pad 386 again into the aperture 388 against the biasing force of the spring 380 to pivot the switch lever 374 and move the peg 394 from its closest inner position to its furthest outer position, disconnecting it from the guard. This allows the guard 120 to pass the peg 394 without engaging the peg 394. The guard 120 is then moved (by rotating) within the curved shroud section 306 to move the cross bar from below the lower front edge 396 of the guard 120. The guard 120 is then passed through the rectangular aperture to remove it from the shroud 300, disconnecting the shroud 300 from the circular saw.

As an alternative design, the peg 394 could comprise a chamfer (not shown). This enables the shroud 300 to be mounted on the guard 120 without depression of the finger pad 386 of the switch lever 374.

Pivotally mounted on the outer shroud wall 308 of the main housing 302 is a transparent cover 400. The cover 400 is the same shape as and capable of covering the hole 314 formed through the outer shroud wall 308, which is rectangular in shape with the top corners 316 formed at an angle to the sides 318 of the hole 314. The cover 400 is mounted to the outer wall 308 via a cover pivot pin 402 which locates inside of three pin supports 404 formed along the top of the cover 400 and two pin supports 406 mounted on the wall 308 along the top of the hole 314. The cover 400 can pivot from a closed position where it covers the hole 314 to an open position where the hole 314 is open and exposed. When the cover is in the open position, the end 94 of the output spindle 70 and the blade 106 is exposed allowing for the blade 106 to be replaced. Catches 408 formed on the edge of the cover 400, are capable of engaging with the edge of the hole 314 to releasably lock the cover 400 in the closed position.

The invention claimed is:

1. A cut off saw comprising:

a housing;

a motor mounted within the housing;

a gear case mounted on the housing, the gear case having an end face which extends from a side of the housing;

an arcuate plate attached to the end face of the gear case, the arcuate plate including a series of projections facing away from the end face;

an output spindle for a cutting blade which passes through and extends from the end face of the gear case which is rotationally driven about a longitudinal axis by the motor when the motor is activated, the arcuate plate extending partly around the longitudinal axis of the output spindle;

a guard rotatably mounted on the end face of the gear case for rotation about the longitudinal axis surrounds the output spindle and at least part of the periphery of a cutting blade when the cutting blade is mounted on the output spindle and includes a side wall that faces toward the end face, the side wall includes a series of recesses which face towards the end face and which are capable of aligning and engaging with the series of projections;

a biasing mechanism that forces the guard towards the end face of the gear case in the direction parallel to the longitudinal axis such that at least one of the series of projections enter into at least one of the series of recesses when the at least one of the series of projections and the at least one of the series of recesses are aligned;

the guard moveable towards and away from the end face of the gear case in a direction parallel to the longitudinal axis and against the biasing force of the biasing mechanism to disengage the at least one of the series of projections from the at least one of the series of recesses;

the guard rotationally locked to the end face of the gear case when the at least one of the series of projections is engaged with the at least one of the series of recesses;

the guard freely rotatable on the end face of the gear case when the at least one of the series of projections is disengaged from the at least one of the series of recesses.

2. The cut off saw, as recited in claim 1, wherein the biasing mechanism comprises a wavy spring.

3. The cut off saw, as recited in claim 2, wherein the wavy spring is sandwiched between the inner wall of the guard and a washer.

4. The cut off saw, as recited in claim 3, wherein the washer is attached to the end face of the gear case.

5. A cut off saw, as recited in claim 1, wherein a position of the series of recesses relative to a position of the series of projections is such that the guard is capable of being locked in pre-set angular positions relative the end face of the gear case.

6. A cut off saw, as recited in claim 5, wherein a number of recesses of the series of recesses is greater than a number of projections of the series of projections so that every projection of the series of projections is capable of being engaged with a recess of the series of recesses when the guard is in a plurality of angular positions on the end face.

7. A cut off saw, as recited in claim 1, wherein the projections of the series of projections are semi-spherical in shape.

8. A cut off saw, as recited in claim 1, wherein the recesses of the series of recesses are semi-spherical in shape.

9. A cut off saw, as recited in claim 1, wherein there are three projections in the series of projections which extend from the side of the arcuate plate.

10. A cut off saw, as recited in claim 1, wherein there are five recesses in the series of recesses.

11. A cut off saw, as recited in claim 1, wherein projections of the series of projections are located equidistantly on a circumferential path on the arcuate plate which extends around the longitudinal axis of the output spindle, wherein recesses of the series of recesses are located equidistantly on a circumferential path on the side wall which extends around the longitudinal axis of the output spindle, the radius of the circumferential path being the same as the circumferential path of the series of projections, the distance between adjacent recesses of the series of recesses being the same as that of the projections of the series of projections so that the projections of the series of projections and the recesses of the series of recesses are capable of being aligned when the guard is rotated to appropriate angular positions.

12. A cut off saw, as recited in claim 1, wherein the size of the recesses of the series of recesses are all the same size and the size of the projections of the series of projections are all the same size, so that the projections of the series of projections are capable of engaging with and entering into the recesses of the series of recesses.

13. A cut off saw, as recited in claim 1, wherein the side wall is arranged so that when the guard is mounted on the end face, the inner side wall is flush with the end face when the series of projections are aligned with and located within the series of recesses.

14. A cut off saw, as recited in claim 1, wherein the arcuate plate is attached to the end face of the gear case using bolts.

* * * * *